P. M. SHARPLES.
ARTIFICIAL STONE.
APPLICATION FILED APR. 29, 1910.
1,049,410.
Patented Jan. 7, 1913.
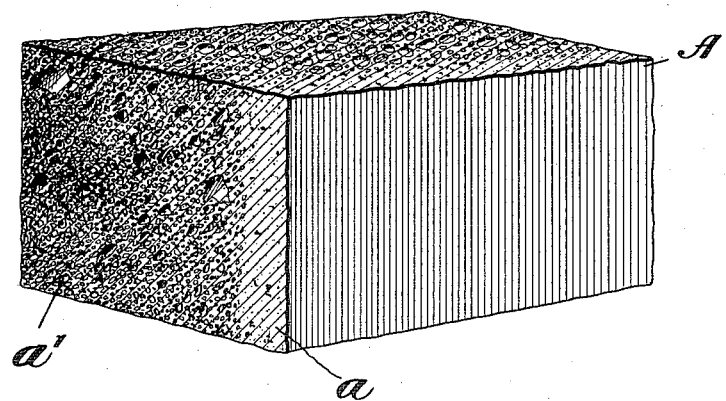
A Block of Igneous Stone having a Compressed Outer Stratum or Face, the surface of which is finished, and a Posterior Cellular Mass, such product being preferably formed of silica sand and a vitreous binder.
WITNESSES:
INVENTOR
P. M. Sharples
BY
C. N. Butler
ATTORNEY.

UNITED STATES PATENT OFFICE.

PHILIP M. SHARPLES, OF WEST CHESTER, PENNSYLVANIA.

ARTIFICIAL STONE.

1,049,410. Specification of Letters Patent. Patented Jan. 7, 1913.

Application filed April 29, 1910. Serial No. 558,416.

*To all whom it may concern:*

Be it known that I, PHILIP M. SHARPLES, a citizen of the United States, residing at West Chester, in the county of Chester and State of Pennsylvania, have invented an Improved Artificial Stone.

My invention contemplates the manufacture of artificial stone comprising a porous interior combined with a refined and compact exterior having a finished surface. A product having these characteristics is valuable, by reason of its combination of a solid exterior with a cellular interior, because it is light, it effects a saving of raw material, it obviates the usual labor of finishing, it has capacity for resisting the penetration of moisture, it is not readily deteriorated by the weather, and it withstands abrasions and wear satisfactorily.

A form of the product is illustrated in the accompanying drawing which represents a perspective view of a block embodying my invention.

The block A represents an igneous stone having the compressed outer stratum or face $a$, the surface of which is finished, and the posterior cellular mass $a'$, such product being preferably formed of silica sand and a vitreous binder.

A product of this character may be produced by heating silica sand mixed with a percentage of glass (sufficient to provide a binder for the sand) until the composition or the binding component of it is fused to a greater or less degree; placing the material thus heated in molds, and working the surface or outer portion of the material, to the contour desired, so as to effect the consolidation of the particles of such surface or outer portion without substantially consolidating the adhering interior particles or the interior which has been rendered porous by the gases developed in heating. It is not, however, essential to my invention that a particular material or materials be used, and it is my purpose to reduce the cost of the product by the use of a lower grade of material for the interior than for the exterior. The body of the stone may be made of an inexpensive green glass cullet or slag, while higher grade white glass may be used for the surface, it being usually necessary to work and finish only the surface to be exposed.

The working of the particles of the outer portion to form the desired surface may be effected by quick light blows struck with a hammer or paddle, or by working the material laterally, parallel to the finished surface desired, with a roller or smoothing tool, the operations being of such character that the interior of the body shall not be subjected to the pressure commonly employed in the manufacture of artificial stone, while the surface stratum is worked to a comparatively smooth finish by force exerted during an instant insufficient for its communication throughout the mass, or in such direction as not to be communicated to the interior of the mass.

The stone thus produced is of heterogeneous character, having a dense and smoothly finished surface from which the structure gradually decreases in density and refinement toward the interior.

Having described my invention, I claim:

1. An artificial igneous stone of homogeneous composition comprising a posterior cellular mass and a compressed face.

2. An artificial igneous stone composed of silica sand and a vitreous binder and comprising a posterior cellular mass and a compressed face.

3. An artificial igneous stone comprising a vitreous binder and a posterior cellular mass graduated to a compressed face.

In witness whereof I have hereunto set my name this 26th day of April, 1910, in the presence of the subscribing witnesses.

PHILIP M. SHARPLES.

Witnesses:
GEO. W. MCCONKEY,
I. ROBERTS COMFORT.